United States Patent [19]

Barth et al.

[11] Patent Number: 4,558,095

[45] Date of Patent: Dec. 10, 1985

[54] COATING COMPOSITION CONTAINING POLYMERIC SURFACTANT

[75] Inventors: Bruce P. Barth, White Plains, N.Y.; Charles B. Mallon, Belle Mead, N.J.

[73] Assignee: Union Carbide Corporation, Danbury, Conn.

[21] Appl. No.: 718,369

[22] Filed: Apr. 1, 1985

[51] Int. Cl.[4] .................... C08L 27/22; C08L 27/06; C08L 29/04; C08L 35/06
[52] U.S. Cl. ....................... 525/57; 525/207; 525/129; 525/66; 524/517; 524/435
[58] Field of Search ................ 525/57, 221, 207

[56] References Cited

U.S. PATENT DOCUMENTS

| | | | |
|---|---|---|---|
| 3,219,729 | 11/1965 | Meyers et al. | 525/57 |
| 3,296,230 | 1/1967 | Gateff et al. | 525/62 |
| 3,914,333 | 10/1975 | Labana et al. | 525/57 |
| 3,966,672 | 6/1976 | Gaylord | 525/197 |
| 4,452,948 | 6/1984 | Marrion et al. | 525/207 |
| 4,511,682 | 4/1985 | Mayer et al. | 523/402 |

*Primary Examiner*—Carman J. Seccuro

*Attorney, Agent, or Firm*—Jean B. Mauro

[57] ABSTRACT

A coating composition comprising:
(a) A graft copolymer, having surfactant properties, comprising the reaction product of (i) a vinyl copolymer comprising vinyl chloride, a vinyl carboxylate ester, and a source of hydroxyl groups, such that the hydroxyl content prior to reaction is about 0.5 to about 8% by weight of the vinyl copolymer and of which about 1 to about 75% of said hydroxyl groups have been reacted with (ii) an anhydride copolymer comprising the reaction product of an aromatic monomer and a dicarboxylic acid anhydride, such that the graft copolymer has a molecular weight of about 2,000 to about 30,000, and a vinyl copolymer/anhydride copolymer weight ratio of about 20 to about 2, of which a sufficient number of carboxyl groups have been hydrolyzed to produce surfactant properties;
(b) a dispersible powder,
(c) optionally, other hard resins,
(d) optionally, a rubbery polymer,
(e) optionally, a supplemental surfactant,
all mixed in an organic solvent.

11 Claims, No Drawings

COATING COMPOSITION CONTAINING POLYMERIC SURFACTANT

BACKGROUND OF THE INVENTION

Coating compositions containing dispersible powders typically must include a dispersing agent for such powders. It is essential that such dispersing agent be compatible both with any binder resin in the coating, and with the end use of the coated product. For example, magnetic recording tape is produced by coating a dispersion of magnetic particles in a binder solution onto a thermoplastic substrate, usually polyethylene terephthalate. The quality of the tape is determined by many factors, one of the most important of which is the degree to which the magnetic pigment has been uniformly dispersed.

It is well known that the binder of a typical magnetic tape comprises a combination of a soft, rubbery polymer, such as a thermoplastic polyurethane (e.g., Estane 5701F-1 from B. F. Goodrich) and a hard resin, such as a vinyl chloride/vinyl acetate/vinyl alcohol terpolymer (e.g., UCAR Solution Vinyl Resin VAGH from Union Carbide Corporation), in a weight ratio of about 30/70 to 70/30. Of these two types of polymers, the hard resin is typically a far better pigment-dispersing medium for the magnetic pigment, as judged by gloss measurements, microscopic observation and magnetic property evaluations.

Nevertheless, it has still been necessary to add low molecular weight, monomeric dispersing agents to formulations of magnetic pigment in solutions of VAGH in order adequately to disperse the pigment.

The need for these low molecular weight dispersants in order to achieve a high degree of dispersion is a serious problem since these materials are capable of exuding to the tape surface on aging, resulting in "dropouts," plasticization of the tape surface, fouling of the record/playback heads, and other problems.

SUMMARY OF THE INVENTION

It has now been found that excellent dispersion of dispersible powder, e.g., magnetic pigment, can be achieved by use of the graft polymeric surfactant of this invention. Accordingly, this invention provides a coating composition comprising:

(a) a graft copolymer, having surfactant properties, comprising the reaction product of (i) a vinyl copolymer comprising vinyl chloride, a vinyl carboxylate ester, and a source of hydroxyl groups, such that the hydroxyl content prior to reaction is about 0.5 to about 8% by weight of the vinyl copolymer and of which about 1 to about 75% of said hydroxyl groups have been reacted with (ii) an anhydride copolymer comprising the reaction product of an aromatic monomer and a dicarboxylic acid anhydride, such that the graft copolymer has a molecular weight of about 2,000 to about 30,000, preferably about 15,000 to about 25,000, and a vinyl copolymer/anhydride copolymer weight ratio of about 20 to about 2, preferably about 5 to about 2, of which a sufficient number of carboxyl groups have been hydroxlyzed to produce surfactant properties.

(b) a dispersible powder,
(c) optionally, a rubbery polymer,
(d) optionally, other hard resins,
(e) optionally, a supplemental surfactant, and
(f) optionally, other materials known to the art, all mixed in an organic solvent.

As used herein, the term "molecular weight" refers to the number average molecular weight ($M_n$).

The graft copolymer of this invention achieves its benefits by incorporating an effective level of surfactant properties into a relatively high molecular weight polymeric structure, thereby eliminating or greatly reducing unwanted migration of the dispersant.

DESCRIPTION OF THE INVENTION

The procedures for preparing the graft copolymer of this invention are described in detail in co-pending, co-assigned application Ser. No. 06/614,799, filed May 29, 1984, now U.S. Pat. No. 4,311,682, the disclosure of which is incorporated herein by reference. The graft copolymer may be prepared, as desired, in solvent-borne (i.e., solution) form suitable for direct use, or in dry powder form suitable for addition to an appropriate liquid medium.

The general procedure for preparing the solvent-borne graft copolymer involves mixing the vinyl copolymer with the anhydride copolymer in a suitable nonreactive solvent, in the presence of a catalyst, raising the temperature to a point at which the grafting reaction will occur, and carrying out the reaction essentially to completion. The reaction product is thereafter hydrolyzed by addition of water, followed by dehydration (e.g., under vacuum) to produce a solvent solution (known as a "varnish"). While the vinyl copolymer can be a tetrapolymer, the preferred materials are terpolymers, especially of vinyl chloride, vinyl acetate, and vinyl alcohol. Examples of suitable terpolymers are those sold by Union Carbide Corporation under the trade designations UCAR "VAGH" and "VYES." The molecular weight of the vinyl copolymer may range of from about 2,000 to about 25,000; however, the range about 3,500 to about 24,000 is especially preferred. The grafting reaction occurs through the hydroxyl groups (preferably, secondary alcohol groups) of the vinyl copolymer; accordingly, it should contain at least about 0.5%, preferably about 2 to about 3%, hydroxyl functionality. For example, resin VAGH has a number average molecular weight of about 23,000 and a secondary hydroxyl content of about 2.3%, and resin VYES has a number average molecular weight of about 4,000 and a hydroxyl content of about 3.0%. Sources for the hydroxyl functionality include, e.g., vinyl alcohol and hydroxyalkyl esters, such as hydroxyethyl and hydroxypropyl acrylates and methacrylates. The anhydride copolymer may be a terpolymer, but is preferably a reaction product of, e.g., styrene and maleic anhydride, having a molecular weight ranging from about 1200 to about 2500, preferably about 1500 to about 2000, and an aromatic/anhydride molar ratio ranging from about 4/1 to about 0.5/1, preferably from about 3/1 to about 1/1. Of particular interest are those copolymers of styrene and maleic anhydride, and styrene-maleic anhydride half-ester terpolymers, sold under the trade designation "SMA." For example, SMA-3000 has a styrene/maleic anhydride ratio of about 3/1 and a number average molecular weight of about 1,900, while SMA-1000 has a styrene/maleic anhydride ratio of about 1/1 and a number average molecular weight of about 1600.

While the choice of nonreactive solvent is not narrowly critical, some routine experimentation may be desirable in order to optimize the solvent in any particular reaction system. Cyclohexanone is especially preferred, although other common solvents, such as methyl acetate (MeAc), tetrahydrofuran (THF), and methylethyl ketone (MEK), may also be used; acetone is considered less desirable since it tends to produce erratic results as to the degree of grafting (i.e., esterification). The catalyst may be any material suitable for catalyzing the grafting reaction; preferred, however, are amines, especially the alkyl amines, such as triethylamine (TEA). The amines have the additional advantage that, when used in sufficient quantity, they will provide formation of a water-soluble salt, should such be desired.

The general procedure for producing a dry powder of the graft surfactant of this invention is similar to that described above, except that the hydrolysis is followed by neutralization, precipitation and recovery of the solids. In the preparation of the powder form, it is desirable to utilize a very volatile solvent, such as acetone, as the reaction medium. The use of acetone, in particular, can be facilitated by use of a relatively low molecular weight anhydride copolymer, such as SMA-1000. Neutralization can be readily accomplished by addition of a reasonably strong acid, e.g., a 50% aqueous solution of an inorganic acid, such as HCl. Precipitation may be performed by adding the varnish to a rapidly agitated mixture of an alcohol and water. Recovery of the solids is by routine techniques of filtration, washing, and drying. The dry powder is then suitable for long-term storage, and eventual use in a liquid medium as a dispersant.

Although the graft copolymeric dispersant of this invention is not necessarily limited to use in connection with magnetic powder-containing coatings, it is particularly useful for that purpose, and will be so illustrated.

It has been found that percent gloss of a magnetic pigment-bearing film is a reliable indicator of the uniformity of the pigment dispersion, and thus of the efficiency of the dispersant. Percent gloss is measured by the well-known procedure using a Gardner "Glossgard" IIA 60° gloss meter, available from Pacific Scientific.

In the examples which follow, "Pferrox" 2228-HC is a gamma-ferric oxide powder, and "Pferrox" 2566 is a cobalt-modified ferric oxide powder, both available from Pfizer, Inc. "Estane" 5701 is a rubbery urethane resin available from B. F. Goodrich. "Gafac" RE-610 is a monomeric surfactant available from GAF Corporation. Dispersions were prepared in a Premier SMA RS II mill using 1.0–1.3 mm glass beads as the grinding medium and a grind time of one hour. Cyclohexanone was used as the solvent for the system, and was adjusted to give a final viscosity of 5,000–20,000 cs (Brookfield LVT, 12 rpm at room temperature).

EXAMPLE 1

Resin Synthesis

Vinyl/SMA grafts were made as either resin solutions or precipitated powders. Resin formulations are shown in Table 1. Procedures are described below:

Graft A—The reaction was carried out for 2 hours at 82° C., after which 30 g. water were added and hydrolysis conducted for 4 hours at 74° C. The product was then vacuum dehydrated to remove the remaining water. The product was a clear amber solution with a solids content of 17.8% and viscosity of 380 cP.

Graft B—The reaction was conducted for 2 hours at 56° C., after which 4.3 g. water were added and the product allowed to cool overnight. The next day, 6 g. HCl/$H_2O$ (1/1 wt.) were added and stirred for 15 minutes. The product was precipitated by adding 100 g. portions to 100 cc of a 4/1 (vol.) blend of methanol/-$H_2O$ in a Waring blender. After one minute of mixing, 100 cc $H_2O$ were added and mixing continued another minute. The precipitate was washed twice with 150 cc water, mixing for 1 minute in the blender and filtering. The precipitate was broken up and dried at ambient temperature and pressure.

Graft C—The reaction was carried out for 2 hours at reflux (57° C.), after which 23.0 grams water were added and reflux continued for $4\frac{1}{4}$ hours. The product was precipitated as in Graft B.

Graft D—The reaction was carried out for 2 hours at 81° C., after which 21.5 g. $H_2O$ were added and heating continued for 2 more hours at 76° C. The excess water was removed by vacuum distillation.

Graft E—The reaction was carried out for 2 hours at 81° C., after which 64.5 g. $H_2O$ were added and heating continued for 2 more hours at 81° C. The excess water was removed by vacuum distillation.

Graft F—The reaction was carried out for 2 hours at reflux (66° C.) Half the triethylamine was added at the start and the other half after $1\frac{1}{4}$ hours. Water (26 g.) was added and heating continued for 3 hours and 10 minutes, at which point 150 g. cyclohexanone were added. The acetone and water were removed by vacuum distillation, following which 150 g. cyclohexanone were added. A clear solution with solids content of 33.9% was obtained.

Graft G—The reaction was conducted for 2 hours and 20 minutes at 66°–69° C., after which 26.0 grams water were added and reacted for 3 hours at 68° C. The excess water was removed by vacuum distillation.

All graft resins were obtained as clear solutions except resins B and C; these latter resins were powders which then were dissolved in the solvent for coating.

EXAMPLE 2

Magnetic Media Coating Formulation

The general procedure used to prepared the magnetic media formulations described below is as follows:

1. 160 g of cyclohexanone, the indicated amount of binder resin solution (as a 15% total solids solution in cyclohexanone), and the indicated amount of GAFAC RE-610 dispersant are added to a quart jar and mixed with an air stirrer.

2. 200 g of magnetic pigment are added slowly with stirring and stirring is continued for 5–10 minutes.

3. The resulting slurry is charged to the Premier Mill and ground in the mill for one hour.

4. The formulation is discharged and applied with a draw-down bar to produce a 1-mil wet coating on glass.

5. After air drying, the 60° C. gloss of the coating is tested.

In the tables below, the amounts of resin and dispersant are shown as weight percent of the component, on a solids basis, relative to the amount of pigment in the formulation. Therefore, a formulation described as VAGH (10), GAFAC (1), Pferrico 2566 would actually contain the following ingredients:

| Ingredient | Amount | Solids |
|---|---|---|
| Cyclohexanone | 160 g | — |
| VAGH (15% in Cyclohexanone | 134 g | 20 g |
| GAFAC RE-610 | 2 g | 2 g |
| Pferrico 2566 | 200 g | 200 g |

TABLE I

MAGNETIC PIGMENT COATINGS

| Composition | Binder Components (%)* | Graft Resin | SMA** (%) | Final Gloss |
|---|---|---|---|---|
| 1 | VAGH/SMA (10) | A | 3000(20) | 101 |
| 2 | VAGH/SMA, VAGH, Estane 5701 (3.8, 2.2, 4) | A | 3000(20) | 79 |
| 3 | VAGH/SMA, Estane 5701F (6, 4) | B | 3000(20) | 95 |
| 4 | VAGH/SMA (10) | D | 3000(5) | 71 |
| 5 | VAGH/SMA (10) | E | 3000(40) | 90 |
| 6 | VAGH/SMA, Estane 7501F-1 (6, 4) | C | 1000(20) | 90 |
| 7 | VAGH/SMA, Estane 5701F-1 (4, 6) | C | 1000(20) | 86 |
| 8 | VAGH/SMA, Estane 5701F-1 (2.5, 7.5) | C | 1000(20) | 80 |

*Binder components are recorded as weight percent based on magnetic pigment, Pferrox 2566. Final gloss is 60 degree gloss measured after 1 hour milling time.
**SMA is recorded as the SMA type and the weight percent based on vinyl.

It is an additional feature of the graft resins of this invention that there benefits as dispersants are retained even when they are blended with other binder materials. This feature is illlustrated in Example 3.

EXAMPLE 3

Magnetic media coatings were prepared as described above, except that the graft copolymer was blended with a non-grafted binder polymer of the prior art, i.e., VAGH. The data are shown in Table II.

TABLE II

Gloss of Coatings with Mixed Graft/Non-graft Binders

| GAFAC | VAGH (Control) | VAGH/Graft 1/1 | Estane 5701/ Graft/VAGH, 2/2/1 |
|---|---|---|---|
| 2% | 100 | 103 | — |
| 1% | 30–50 | 90 | 90 |
| 0 | 20–30 | 90 | 90 |

From the results shown in Examples 1 and 2 it is apparent that the degree of dispersion, as judged by gloss (or by microscopic examination), is excellent even in the absence of a supplemental dispersant.

It has been observed that the effectiveness of the graft copolymer as a dispersant appears to decrease when the molecular weight of vinyl copolymer is too low. This effect is illustrated in Example 4.

EXAMPLE 4

Magnetic media coatings were prepared as described above, except that the graft copolymer was prepared from relatively low molecular weight vinyl polymers. THe data are shown in Table III.

TABLE III

Coatings from Grafts of Lower Molecular Weight Vinyls

| Binder Components (%) | Molecular* Weight | SMA (%) | Final Gloss |
|---|---|---|---|
| XVO-6/SMA(10) | 2,000 | 3000(20) | 60 |
| VYES/SMA(10) | 4,000 | 3000(20) | 107 |

*Molecular weight ($M_n$) of vinyl component prior to grafting.

Table III illustrates that gloss is unsatisfactory when a vinyl polymer of molecular weight 2,000 or lower is used in preparing the graft copolymer.

We claim:

1. A non-aqueous coating composition comprising:
   (a) A graft copolymer, having surfactant properties, comprising the reaction product of (i) a vinyl copolymer having a molecular weight greater than about 3,500, comprising vinyl chloride, a vinyl carboxylic ester, and a source of hydroxyl groups, such that the hydroxyl content prior to reaction is about 0.5 to about 8% by weight of the vinyl copolymer and of which about 1 to about 75% of said hydroxyl groups have been reacted with (ii) an anhydride copolymer comprising the reaction product of an aromatic monomer and a dicarboxylic acid anhydride, such that the graft copolymer has a molecular weight of up to about 30,000, and a vinyl copolymer/anhydride copolymer weight ratio of about 20 to about 2, of which a sufficient number of carboxyl groups have been hydrolyzed to produce surfactant properties;
   (b) a dispersible powder,
   (c) optionally, other hard resins,
   (d) optionally, a rubbery polymer,
   (e) optionally, a supplemental surfactant,
all mixed in an organic solvent.

2. A composition of claim 1 wherein the vinyl carboxylate ester is vinyl acetate.

3. A composition of claim 1 wherein about 2 to about 20% of the hydroxyl groups have been reacted.

4. A composition of claim 1 wherein the aromatic monomer is styrene.

5. A composition of claim 4 wherein the acid anhydride is maleic anhydride.

6. A composition of claim 5 wherein the anhydride copolymer has a molecular weight of about 1,500 to about 2,000.

7. A composition of claim 1 wherein the graft copolymer has a molecular weight of about 15,000 to about 25,000.

8. A composition of claim 1 wherein the vinyl copolymer/anhydride copolymer ratio is about 5 to about 2.

9. A composition of claim 1 wherein the hydrolysis has been performed in the presence of an amine.

10. A composition of claim 9 wherein the amine is an alkanolamine.

11. A composition of claim 1 wherein the dispersible powder is a magnetic powder.

* * * * *